United States Patent
Gollub et al.

(10) Patent No.: US 10,613,951 B2
(45) Date of Patent: Apr. 7, 2020

(54) MEMORY MIRROR INVOCATION UPON DETECTING A CORRECTABLE ERROR

(71) Applicant: International Business Machines Corporation, Armonk, NY (US)

(72) Inventors: Marc A. Gollub, Pflugerville, TX (US); Warren E. Maule, Cedar Park, TX (US); Patrick J. Meaney, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 48 days.

(21) Appl. No.: 15/702,787

(22) Filed: Sep. 13, 2017

(65) Prior Publication Data

US 2019/0079840 A1 Mar. 14, 2019

(51) Int. Cl.
G06F 11/00 (2006.01)
G06F 11/20 (2006.01)
G06F 11/16 (2006.01)
G06F 11/10 (2006.01)

(52) U.S. Cl.
CPC ...... *G06F 11/2087* (2013.01); *G06F 11/1048* (2013.01); *G06F 11/1666* (2013.01); *G06F 11/2066* (2013.01); *G06F 11/2069* (2013.01); *G06F 11/167* (2013.01); *G06F 11/2082* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,609,184 B2* | 8/2003 | Bradshaw | ................ | G06F 8/71 711/162 |
| 7,028,156 B1* | 4/2006 | Kiselev | ............... | G06F 11/1435 711/161 |
| 7,200,726 B1* | 4/2007 | Gole | ................... | G06F 11/2066 711/114 |
| 7,287,138 B2 | 10/2007 | Bland et al. | | |
| 7,444,540 B2* | 10/2008 | Shaw | ...................... | G06F 11/10 714/42 |

(Continued)

OTHER PUBLICATIONS

Wang et al., "A Reliability-Aware Address Mapping Strategy for NAND Flash Memory Storage Systems", IEEE Transactions on Computer-Aided Design of Integrated Circuits and Systems Year: 2014, vol. 33, Issue: 11 pp. 1623-1631.

*Primary Examiner* — Amine Riad
(74) *Attorney, Agent, or Firm* — Cantor Colburn LLP; Bryan Bortnick

(57) ABSTRACT

Aspects of the invention include fetching data requested by a requestor from a primary memory in a memory system that includes the primary memory and a secondary memory mirroring the primary memory. An error status of the data fetched from the primary memory is determined. The error status is one of correctable error (CE), uncorrectable error (UE), and no error. Based at least in part on determining that the data fetched from the primary memory has the error status of no error, the data fetched from the primary memory is output to the requestor. Based at least in part on determining that the data fetched from the primary memory has the error status of UE or CE, the data requested by the requestor is fetched from the secondary memory.

12 Claims, 11 Drawing Sheets

(56) References Cited

U.S. PATENT DOCUMENTS

| | | |
|---|---|---|
| 7,451,387 B2 | 11/2008 | Koktan et al. |
| 7,472,221 B1 * | 12/2008 | Cartmell ............. G06F 11/2069 711/104 |
| 7,644,855 B2 * | 1/2010 | Mori .................... B23K 1/0016 228/246 |
| 7,721,140 B2 | 5/2010 | Dell et al. |
| 8,099,570 B2 * | 1/2012 | O'Connor ........... G06F 11/1076 711/162 |
| 8,352,779 B2 | 1/2013 | Bulusu et al. |
| 8,407,515 B2 * | 3/2013 | Heyrman ............ G06F 11/2094 714/6.12 |
| 8,601,227 B2 | 12/2013 | Swanson et al. |
| 8,601,310 B2 * | 12/2013 | Dreier ................ G06F 11/1666 714/6.1 |
| 8,751,864 B2 | 6/2014 | Swanson et al. |
| 8,898,408 B2 | 11/2014 | Berke et al. |
| 9,037,903 B2 | 5/2015 | Hum et al. |
| 9,336,036 B2 | 5/2016 | Dong et al. |
| 2004/0205384 A1 * | 10/2004 | Lai ...................... G06F 11/1666 714/6.2 |
| 2005/0160311 A1 * | 7/2005 | Hartwell ............... G06F 11/073 714/6.32 |
| 2007/0061612 A1 * | 3/2007 | Henderson .......... G06F 11/1008 714/5.11 |
| 2007/0288792 A1 | 12/2007 | Thorpe et al. |
| 2009/0150721 A1 | 6/2009 | Kochar et al. |
| 2009/0282210 A1 * | 11/2009 | Heyrman ................ G06F 13/28 711/173 |
| 2009/0282300 A1 * | 11/2009 | Heyrman ............ G06F 11/2082 714/708 |
| 2011/0035562 A1 | 2/2011 | Gaither |
| 2013/0151767 A1 | 6/2013 | Berke et al. |
| 2013/0268739 A1 | 10/2013 | Gupta et al. |
| 2018/0188966 A1 * | 7/2018 | Jayakumar .......... G06F 11/1666 |
| 2019/0163557 A1 * | 5/2019 | Nguyen ............. G06F 11/0763 |

* cited by examiner

300

| Memory 1 | | | | |
|---|---|---|---|---|
| Clean | CE | UE | Mem2 | (Mem2) |
| Mem1 | (Mem1) | (Mem1) | (Mem1) | UE |
| Mem1 | Mem1 | Mem1 | | |
| Clean | CE | UE | | |
| Memory 2 | | | | |

FIG. 3

| Memory 1 | | | |
|---|---|---|---|
| Clean | Mem1 | Mem2 | UE |
| CE | Mem1 | (Mem2) | Mem2 |
| UE | Mem1 | (Mem1) | UE |
| | Clean | CE | UE |
| | Memory 2 | | |

MEMORY MIRROR INVOCATION UPON DETECTING A CORRECTABLE ERROR

BACKGROUND

Embodiments of the present invention relate in general to computer memory and more specifically to memory mirror invocation upon detecting a correctable error (CE) in a memory.

In order to deliver powerful computing resources, computer architects must design robust computing systems capable of tolerating and recovering from equipment errors. To build error-tolerant computing systems, computer architects often user memory mirroring technology. Memory mirroring technology employs the use of two redundant memory modules separately storing the same memory contents.

SUMMARY

Embodiments of the present invention include methods, systems, and computer program products for implementing memory mirror invocation upon detecting a correctable error (CE). A non-limiting example method includes fetching data requested by a requestor from a primary memory in a memory system that includes the primary memory and a secondary memory mirroring the primary memory. An error status of the data fetched from the primary memory is determined. The error status is one of correctable error (CE), uncorrectable error (UE), and no error. Based at least in part on determining that the data fetched from the primary memory has the error status of no error, the data fetched from the primary memory is output to the requestor. Based at least in part on determining that the data fetched from the primary memory has the error status of UE, the data requested by the requestor is fetched from the secondary memory. Based at least in part on determining that the data fetched from the primary memory has the error status of CE, the data requested by the requestor is fetched from the secondary memory.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 3 depicts an example table for determining outputs in response to memory fetch requests in a memory system with mirroring;

FIG. 6 depicts a table for determining outputs in response to memory fetch requests in a memory system that analyzes the occurrence of CEs in results from a memory fetch request in accordance with one or more embodiments of the present invention;

Figure 1:
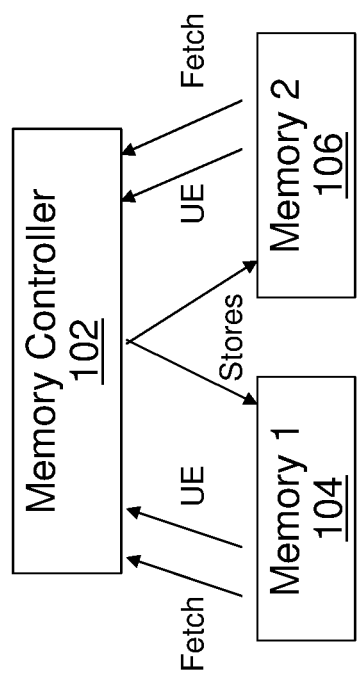
FIG. 1 depicts a block diagram of an exemplary memory system with mirroring.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

In accordance with one or more embodiments of the present invention, correctable error (CE) tags are used along with uncorrectable error (UE) tags to invoke mirroring across two mirrored memory modules to provide a balanced peer-to-peer mirroring strategy. This is contrasted with contemporary approaches which use UE tags and a primary/secondary mirroring strategy where all accesses are to a primary copy until/unless an UE is detected, at which point all accesses switch over to the secondary copy.

Big data is driving memory capacity to extremely large sizes and system reliability continues to change to support the larger sizes. The intrinsic failure rate of individual memory modules, such as dual in-line memory modules (DIMMs), may continue to increase as more parts of increasing complexity are packaged on the same size DIMM. One way to mitigate this increasing failure rate is through memory mirroring. This involves plugging in a memory DIMM and a mirror copy of the memory DIMM with both copies of the memory receiving the same store/write requests and information. When the primary memory DIMM experiences an UE, mirroring can be invoked by using the mirror copy of the memory DIMM to supply the data back to the host or other requestor.

As known in the art, a CE is an error that is detected and corrected by an error correction code (ECC) such as, but not limited to a Hamming code, a Reed-Solomon code, and a parity-check code. Also as known in the art, an UE is an error that is detected, but cannot be corrected by the ECC code.

Also as known in the art, the term miscorrected data refers to data that is identified by hardware or software as correctable, even though it exceeds the correction and detection capabilities of the code. For example, with a simple Hamming code (single-bit correction, double-bit detection), it is possible for a word that has bits 0, 1, and 2 incorrect, to assume that bit 10 is incorrect and flip only bit 10 (a bit that was originally good). This miscorrection of the data (flipping data to an assumed correct state that is not the original data) is referred to as data miscorrection. In another example, a data word can start off clean, or correct, as 0x12345678 (ECC syndromes not shown). If the error passes through a device or interface, it may show up as 0x1234567F (i.e., bits 0, 1, 2 are incorrect—little endian). Instead of correcting this data back to 0x12345678, assume that the ECC function calculates that bit 10 is incorrect and flips bit 10, supposedly back to its original state. However, the flipped and final data is now: 0x1234527F. Thus, not only were bits 0, 1, and 2 not correct, but now bit 10 is wrong as well. Unfortunately, the data now looks good and has a clean ECC code and state. Some bits are wrong, but the data is now treated as good data which causes a data integrity error.

While contemporary approaches protect against detected UEs in the primary DIMM, they do not handle cases where the primary DIMM is experiencing miscorrected data (i.e., what looks like CEs). Thus, contemporary memory mirroring can avoid system checkstops but it does not necessarily protect against miscorrected data, resulting in possible data integrity errors.

In accordance with one or more embodiments described herein, when a CE is detected in data fetched from a primary memory, the data is also fetched from a secondary memory (the mirror copy). If the data fetched from the secondary memory does not contain any errors, that is, it does not contain any CEs or UEs, then the data fetched from the secondary memory is returned to the requestor of the data. In this manner, one or more embodiments of the present invention protect against miscorrected data by providing error free data that has not been corrected by an error correction code (ECC) to the requestor when it is available.

When neither copy of the data fetched from the primary and secondary memory is error free, that is they both have either a CE or UE, and at least one has a CE, different approaches can be taken to determine a response to the requestor of the data. In one or more embodiments of the invention described herein, one of the copies of the data containing the CE is returned to the requestor if an error free copy is not available. In one or more other embodiments described here, an error condition is returned to the requestor if an error free copy is not available. In one or more embodiments of the invention described herein the actual data retrieved is compared when both copies have a CE and the results of the comparison are used to determine whether to return the data or an error condition to the requestor. In accordance with one or more embodiments of the invention described herein, if the contents of the data from primary memory and the secondary memory match, then a copy of the data is returned to the requestor, otherwise an error status is returned.

Turning now to FIG. 1, a block diagram of an exemplary contemporary memory system 100 with mirroring is generally shown. The memory controller 102 shown in FIG. 1 is connected to memory 1 104 and memory 2 106. Memory 1 104 and memory 2 106 are mirror copies of each other, with the memory controller 102 storing copies of any data to both memory 1 104 and memory 2 108. In addition, as shown in FIG. 1, all fetched data has an UE flag that is returned to the requesting memory controller 102 along with the fetched data. In an embodiment, there is a separate signal to indicate that an UE occurred. In another embodiment, an UE is indicated with a particular ECC code on the data. An UE that has previously been detected and is now flagged as bad is often referred to as a special UE.

Figure 2:
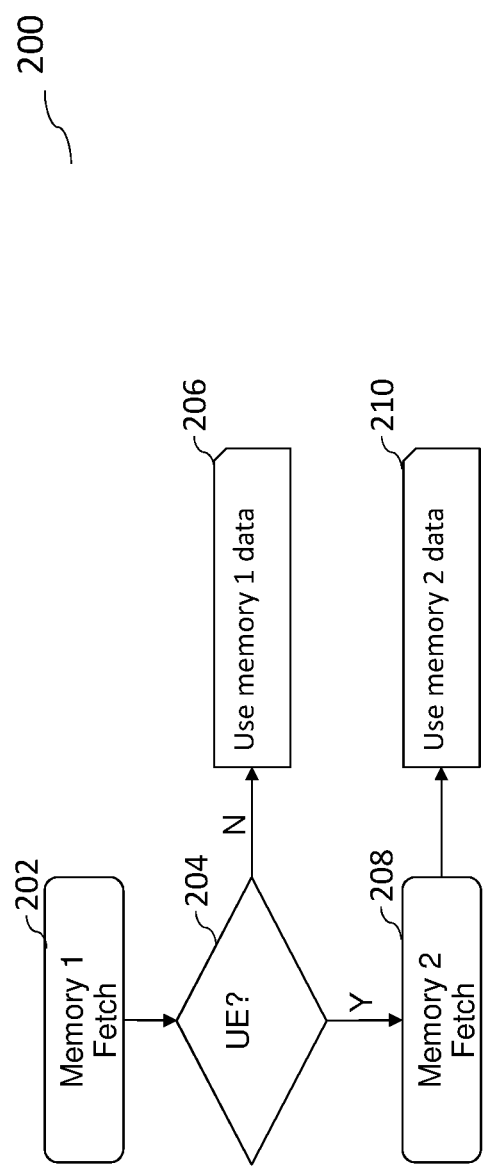
FIG. 2 depicts a flow diagram for implementing an exemplary memory mirroring process.

Turning now to FIG. 2, a flow diagram 200 for implementing an exemplary contemporary memory mirroring process using the memory system 100 shown in FIG. 2 is generally shown. The processing shown in FIG. 2 can be performed by the memory controller 102 of FIG. 1. At block 202, data is fetched from memory 1 104 (the primary memory) and at block 204 it is determined whether the fetched data has an error status of UE for example, by detecting that the UE flag returned with the fetched data is set to indicate an UE. If an UE was not detected, then block 206 is performed and the data fetched from memory 1 104 is returned to the requester (e.g., memory controller 102). If an UE was detected, then block 208 is performed and the data is fetched from memory 2 106 (the secondary memory). The data fetched from memory 2 106 is returned to the requestor. Memory 2 106 can then become the primary memory until an UE is detected and the primary memory can switch back to memory 1 104. Alternatively, after block 210, memory 1 104 can continue to be the primary memory until, for example, a threshold number of errors is detected on memory 1. When the threshold number is reached, memory 2 106 can become the primary memory.

Turning now to FIG. 3, an example table 300 for determining outputs in response to memory fetch requests in the memory system 100 described in reference to FIGS. 1 and 2 is generally shown. "Clean" refers to a fetch where no correction was required, that is, the fetched data had no errors and a status of "no error detected." The circled entries in the table 300 represent potential miscorrect conditions. As shown in the table 300 a miscorrect can occur any time that fetched data with a CE is returned to the requestor. For instance, in the earlier example with data 0x12345678 that is returned as 0x1234527F, the channel error would indicate a CE on the data and that data would be used. However, the data should have been 0x12345678. In these cases, fetching data from memory 2 106 can return the 0x12345678 data, rather than rely on the incorrect 0x1234527F, leading to incorrect calculations or system hangs or other catastrophic errors. Thus, even with memory mirroring, data integrity may not necessarily always be met in the prior art.

One or more embodiments of the present invention reduce the likelihood of a miscorrect occurring by tracking both UEs and CEs in fetched data.

Figure 4:
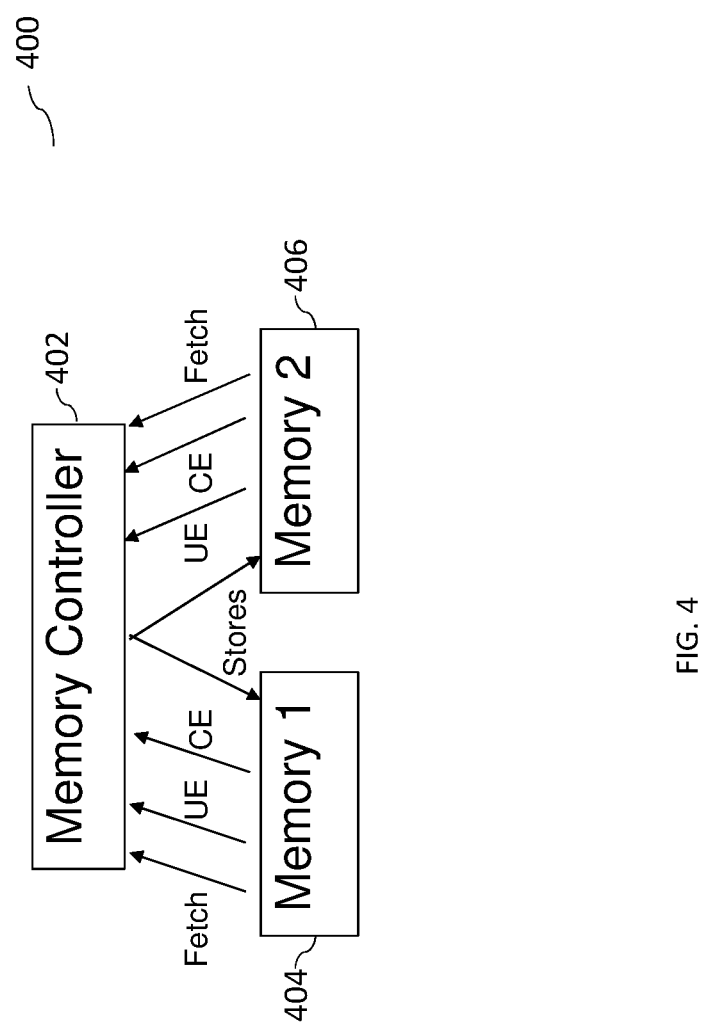
FIG. 4 depicts a block diagram of a memory system with mirroring that analyzes the occurrence of correctable errors (CEs) in accordance with one or more embodiments of the present invention.

Turning now to FIG. 4, a block diagram of a memory system 400 with mirroring that analyzes the occurrence of CEs is generally shown in accordance with one or more embodiments of the present invention. The memory controller 402 shown in FIG. 4 is connected to memory 1 404 and memory 2 406. Memory 1 404 and memory 2 406 are mirror copies of each other, with the memory controller 402 storing copies of any data to both memory 1 404 and memory 2 408. Memory 1 404 and memory 2 406 can each be implemented by one or more memory devices. Memory 1 404 and memory 2 406 can also each be implemented by one or more memory modules that include memory devices. In addition, as shown in FIG. 4, all fetched data has an UE flag and a CE flag that are returned to the requesting memory controller 102 along with the fetched data. In an embodiment, CE and UE flags are set by having dedicated signals which accompany the data indicating that a CE or UE occurred. This information is transported back to the host controller along with the data.

Figure 5:
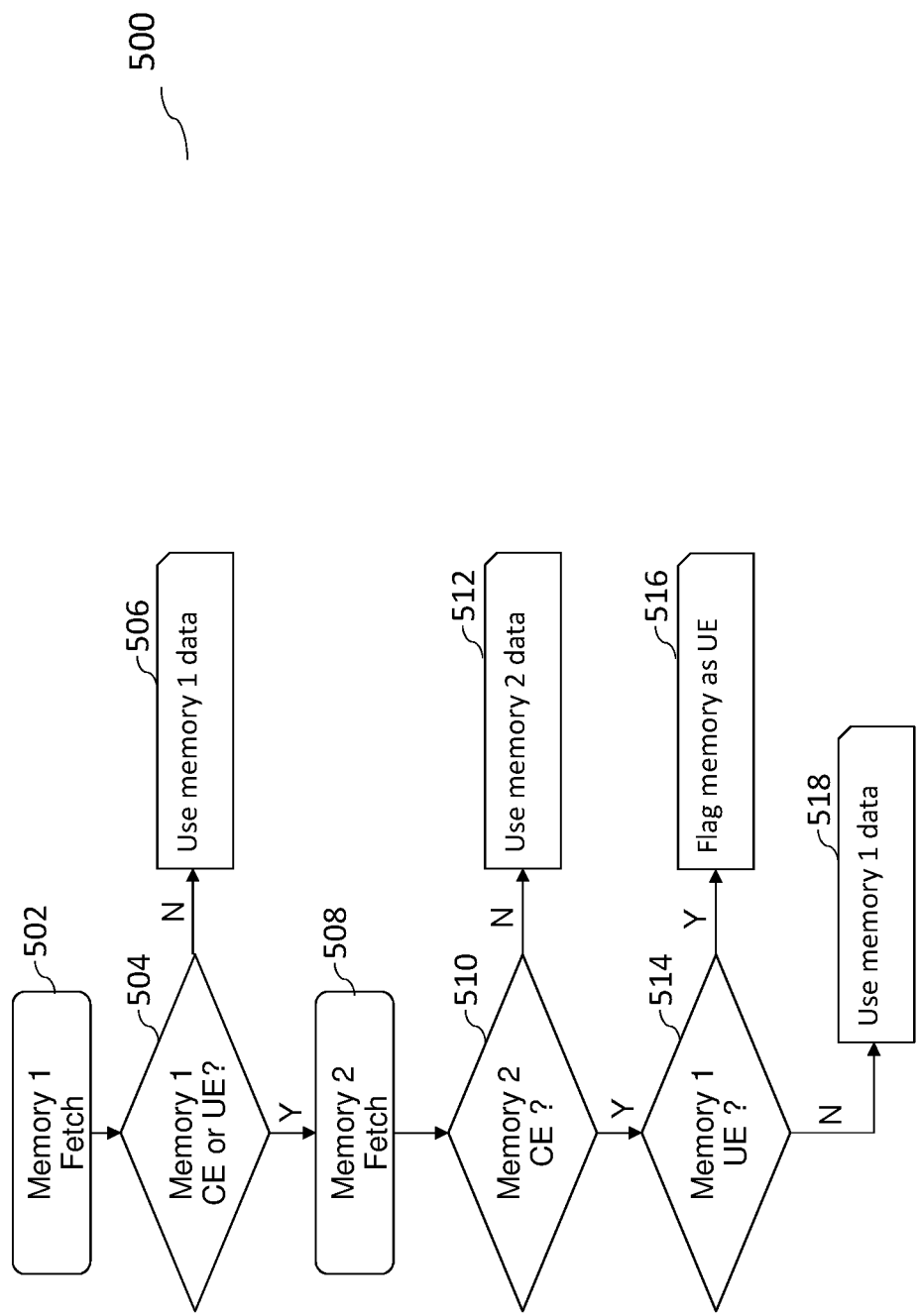
FIG. 5 depicts a flow diagram for implementing a memory mirroring process that analyzes the occurrence of CEs in results from a memory fetch request in accordance with one or more embodiments of the present invention.

Turning now to FIG. 5, a flow diagram 500 for implementing a memory mirroring process that analyzes the occurrence of CEs in results from a memory fetch request is generally shown in accordance with one or more embodiments of the present invention. The processing shown in FIG. 5 can be performed by the memory controller 402 of FIG. 4. At block 502, data is fetched from memory 1 404 (the primary memory) and at block 504 it is determined whether an error status of CE or UE is associated with the fetched data from memory 1 404. The error status of CE can be detected for example, by detecting that the CE flag returned with the fetched data from memory 1 404 is set to indicate a CE. The error status of UE can be detected for example, by detecting that the UE flag returned with the fetched data from memory 1 404 is set to indicate an UE. If neither a CE nor an UE was detected (i.e., the error status is "no error detected") then block 506 is performed and the data fetched from memory 1 404 is returned to the requester (e.g., memory controller 402).

If a CE or UE is detected in the data fetched from memory 1 404, then block 508 is performed and the data is fetched from memory 2 406 (the secondary memory). At block 510, it is determined whether the data fetched from memory 2 406 has an error status of UE. If the data fetched from memory 2 406 does have an error status of UE (i.e., the data does not have an error status of "no error detected" or CE) then processing continues at block 512, where the data fetched from memory 2 406 is returned to the requestor. Otherwise, the data fetched from memory 2 406 has an error status of UE and processing continues at block 514, where it is determined if the data fetched from memory 1 404 has an error status of CE. If the data fetched from memory 1 404 has an error status of CE, then processing continues at block 518 and the data fetched from memory 1 404 is returned to the requestor. Otherwise, both the data fetched from memory 1 404 and the data fetched from memory 2 406 have error statuses of UE and the error status of UE (e.g. an UE indicator) is returned to the requestor.

Turning now to FIG. 6, a table 600 for determining outputs in response to memory fetch requests in the memory system 400 using the processing flow described in FIG. 5 is generally shown in accordance with one or more embodiments of the present invention. The circled entries in the table 600 represent potential miscorrect conditions. When compared to table 300 of FIG. 3, one less condition in table 600 of FIG. 6 results in a potential miscorrect. In the embodiment described in reference to FIGS. 5 and 6, when data fetched from the primary memory has an error condition of CE, the data is fetched from the secondary memory and checked to see if it error free. If the data fetched from the secondary memory has an error status of "no error detected" or "clean" is used in place of the data fetched from the primary memory which has been corrected, thus removing one possible miscorrect condition that occurs when the data fetched from the primary memory has an error status of CE.

In the example described previously, original data in both memory 1 404 and memory 2 406 might both be 0x12345678. If memory 1 404 miscorrected the data to 0x1234567F (which is somewhat rare), it is very unlikely that memory 2 406 also miscorrected the data in any way. The data from memory 2 406 is likely 0x123456768. The one or more embodiments described in reference to FIGS. 5 and 6 is a vast improvement over the prior art. However, there are still some conditions where there can also be a miscorrect in memory 2 406. This is addresses in one or more other embodiments described herein.

Figure 7:
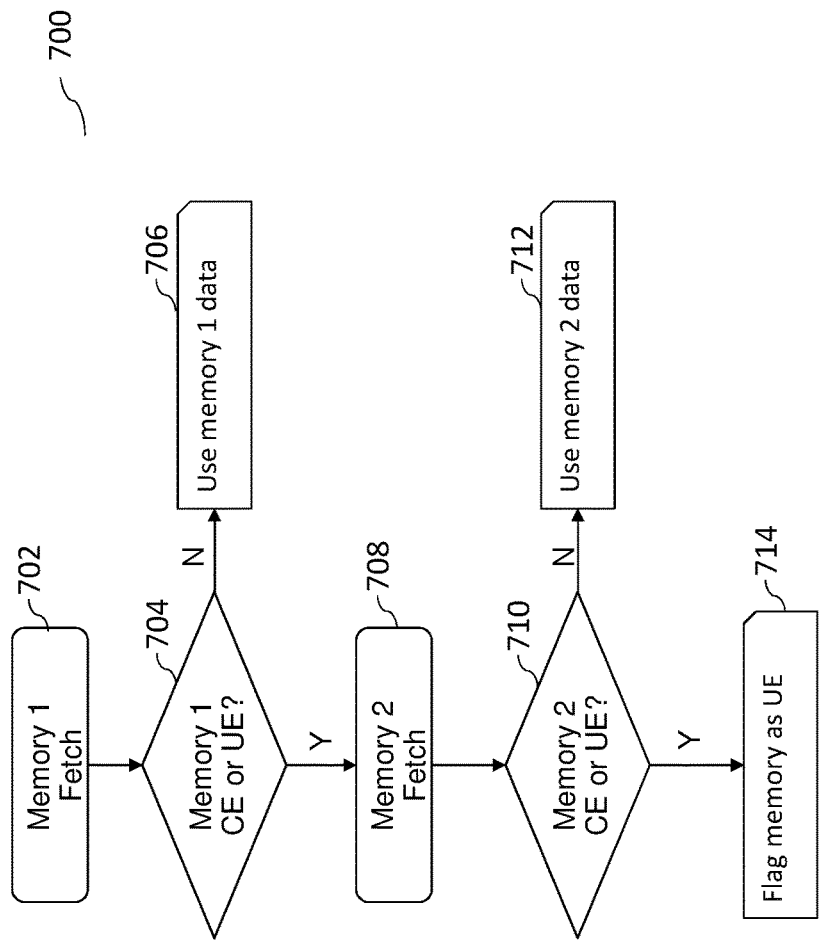
FIG. 7 depicts a flow diagram for implementing a memory mirroring process that replaces the occurrence of CEs in results from a memory fetch request with uncorrectable errors (UEs) in accordance with one or more embodiments of the present invention.

Turning now to FIG. 7, a flow diagram 700 for implementing a memory mirroring process that replaces the occurrence of CEs in results from a memory fetch request with UEs is generally shown in accordance with one or more embodiments of the present invention. The processing shown in FIG. 7 can be performed by the memory controller 402 of FIG. 4. At block 702, data is fetched from memory 1 404 (the primary memory) and at block 704 it is determined whether an error status of CE or UE is associated with the fetched data from memory 1 404. If neither a CE nor an UE was detected (i.e., the error status is "no error detected") then block 706 is performed and the data fetched from memory 1 404 is returned to the requester (e.g., memory controller 402).

If a CE or UE was detected in the data fetched from memory 1 404, then block 708 is performed and the data is fetched from memory 2 406 (the secondary memory). At block 710, it is determined whether the data fetched from memory 2 406 has an error status of UE or CE. If the data fetched from memory 2 406 does not have an error status of UE or CE (i.e., the data has an error status of "no error") then processing continues at block 712, where the data fetched from memory 2 406 is returned to the requestor. Otherwise, block 714 is performed and an error status of UE (e.g. an UE indicator) is returned to the requestor.

Figure 8:
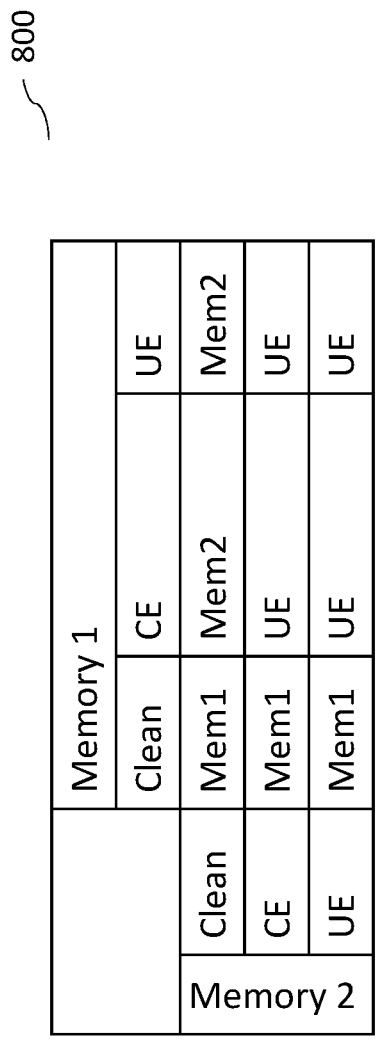
FIG. 8 depicts a table for determining outputs in response to memory fetch requests in a memory system with mirroring that replaces the occurrence of CEs in results from a memory fetch request with UEs in accordance with one or more embodiments of the present invention.

Turning now to FIG. 8, a table 800 for determining outputs in response to memory fetch requests in the memory system 400 using the processing flow described in FIG. 7 is generally shown in accordance with one or more embodiments of the present invention. Returning only fetched data that has not been corrected (i.e., only fetched data with an error status of "no error detected" or "clean") eliminates the risk of a miscorrect, however it increases the amount of UEs indicator returned to the requestor. In the previous example, original data in both memory 1 404 and memory 2 406 might be 0x12345678. If memory 1 404 miscorrected the data to 0x1234567F (which is somewhat rare), and memory 2 406 miscorrected the data to another pattern, for example 0x14F45678 (also very rare), the one or more embodiments described in reference to FIGS. 7 and 8 would flag this as an UE, since the corrected data for both cases may not be trust worthy due to simultaneous CEs. However, if both channels had CEs, but returned the data 0x12345678, the good data could have been used, but was flagged as an UE unnecessarily. Therefore, it would be good to have a better way to take care of the case where the data was corrected and is still good. This is covered in the one or more embodiments described below in reference to FIGS. 9 and 10.

Figure 9:
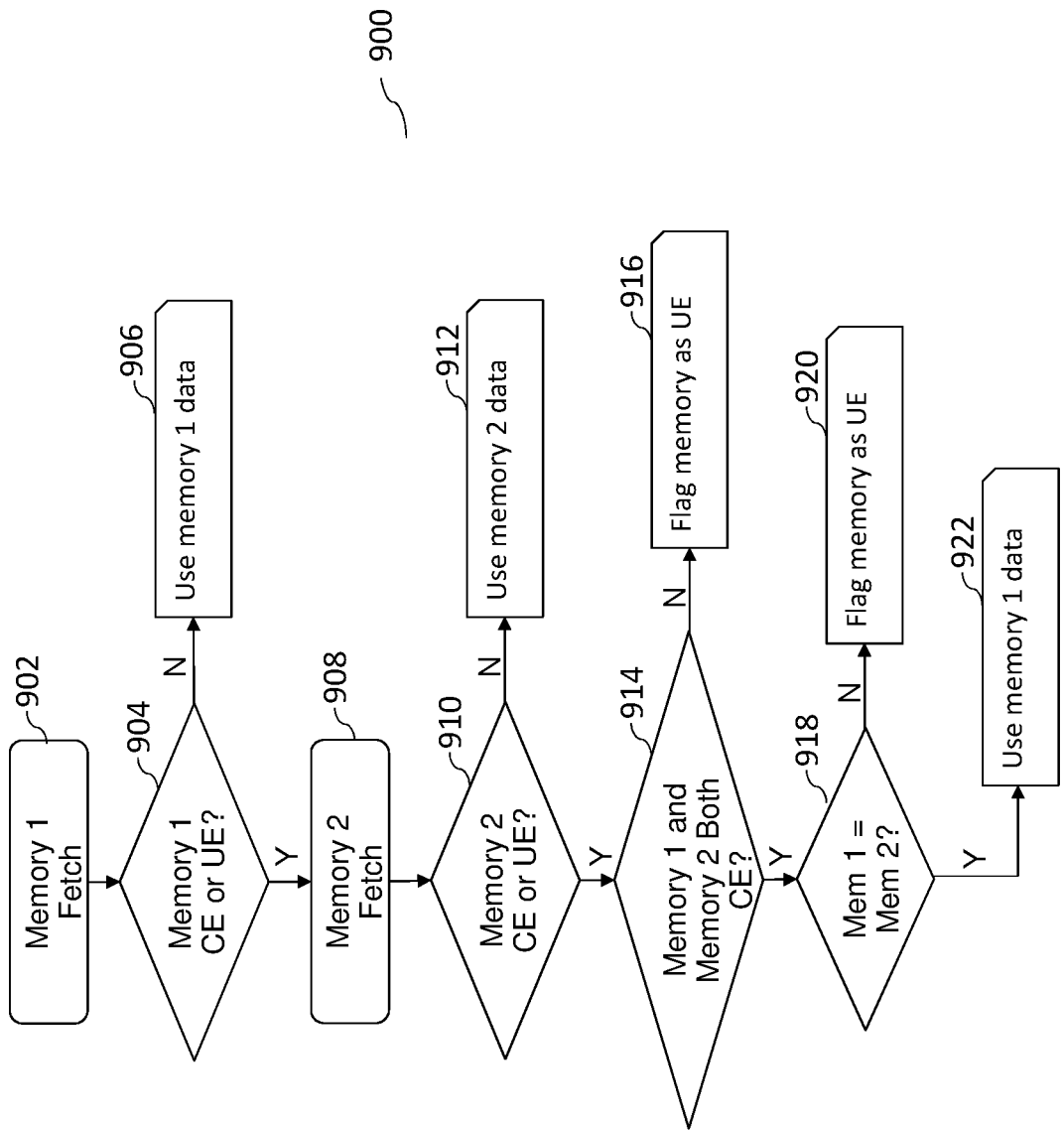
FIG. 9 depicts a flow diagram for implementing a memory mirroring process that replaces the occurrence of particular CEs in results from a memory fetch request with UEs in accordance with one or more embodiments of the present invention.

Turning now to FIG. 9, a flow diagram 900 for implementing a memory mirroring process that analyzes the occurrence of CEs in results from a memory fetch request is generally shown in accordance with one or more embodiments of the present invention. The processing shown in FIG. 9 can be performed by the memory controller 402 of FIG. 4. At block 702, data is fetched from memory 1 404 (the primary memory) and at block 704 it is determined whether an error status of CE or UE is associated with the fetched data from memory 1 404. If neither a CE nor an UE was detected (i.e., the error status is "no error detected") then block 906 is performed and the data fetched from memory 1 404 is returned to the requester (e.g., memory controller 402).

If a CE or UE was detected in the data fetched from memory 1 404, then block 908 is performed and the data is fetched from memory 2 406 (the secondary memory). At block 910, it is determined whether the data fetched from memory 2 406 has an error status of UE or CE. If the data fetched from memory 2 406 does not have an error status of UE or CE (i.e., the data has an error status of "no error detected") then processing continues at block 912, where the data fetched from memory 2 406 is returned to the requestor. Otherwise, block 914 and it is determined if both the data fetched from memory 1 404 and the data fetched from memory 2 406 have an error status of CE. If they do not both have error statuses of CE, then block 916 is performed and an error status of UE (e.g., an UE indicator) is returned to the requestor.

If it is determined at block 914 that both the data fetched from memory 1 404 and the data fetched from memory 2 406 have an error status of CE, then block 918 is performed to compare the fetched data. If the result of correcting errors, which may include the same or different errors and error locations, is the same string of data bits, then there is a higher probability that the data is correct (and not miscorrected data). In the embodiment shown in FIG. 9, if the data that was fetched from memory 1 404 is the same as the data that was fetched from memory 2 406, then block 922 is performed and the data fetched from memory 1 404 is returned to the requestor. Otherwise, block 920 is performed and an error status of UE (e.g. an UE indicator) is returned to the requestor.

Figure 10:
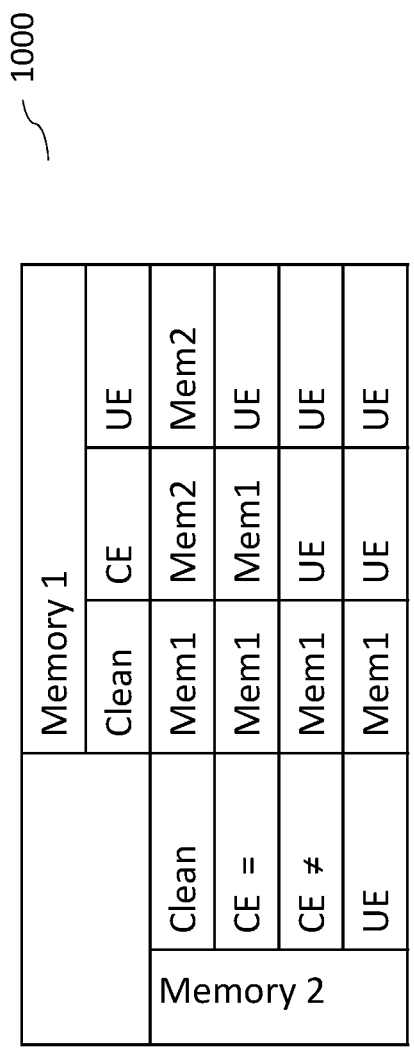
FIG. 10 depicts a table for determining outputs in response to memory fetch requests in a memory system with mirroring that replaces the occurrence of particular CEs in results from a memory fetch request with UEs in accordance with one or more embodiments of the present invention.

Turning now to FIG. 10, a table 1000 for determining outputs in response to memory fetch requests in a memory system 400 with mirroring using the processing flow shown in FIG. 9 is generally shown in accordance with one or more embodiments of the present invention. The table 1000 shown in FIG. 10 is similar to the table 800 shown in FIG. 8, with the difference being that in table 1000 when both the primary and secondary memory have a status of CE, the results are used when the data that was fetched from both places has the same value. Thus, table 1000 has one less condition when an UE indicator is returned to the requestor when compared to table 800 but requires an additional compare process.

In the previous example, original data in both memory 1 404 and memory 2 406 might both be 0x12345678. If memory 1 404 miscorrected the data or memory 2 406 miscorrected the data, it cannot be determined which one had the correct data and which one did not. However, if both channels corrected the data to the same result, it is extremely likely that the corrected data from either channel is correct (since a correct data correction is orders of magnitude more likely than miscorrected data). Comparing the corrected data for both memory 1 404 and memory 2 406 can be used for the case where both memory 1 404 and memory 2 406 had errors that were properly corrected. As shown in the one or more embodiments described in reference to FIGS. 9 and 10, if the data does not compare, then the output cannot be trusted and the data is flagged and treated as an UE.

Figure 11:
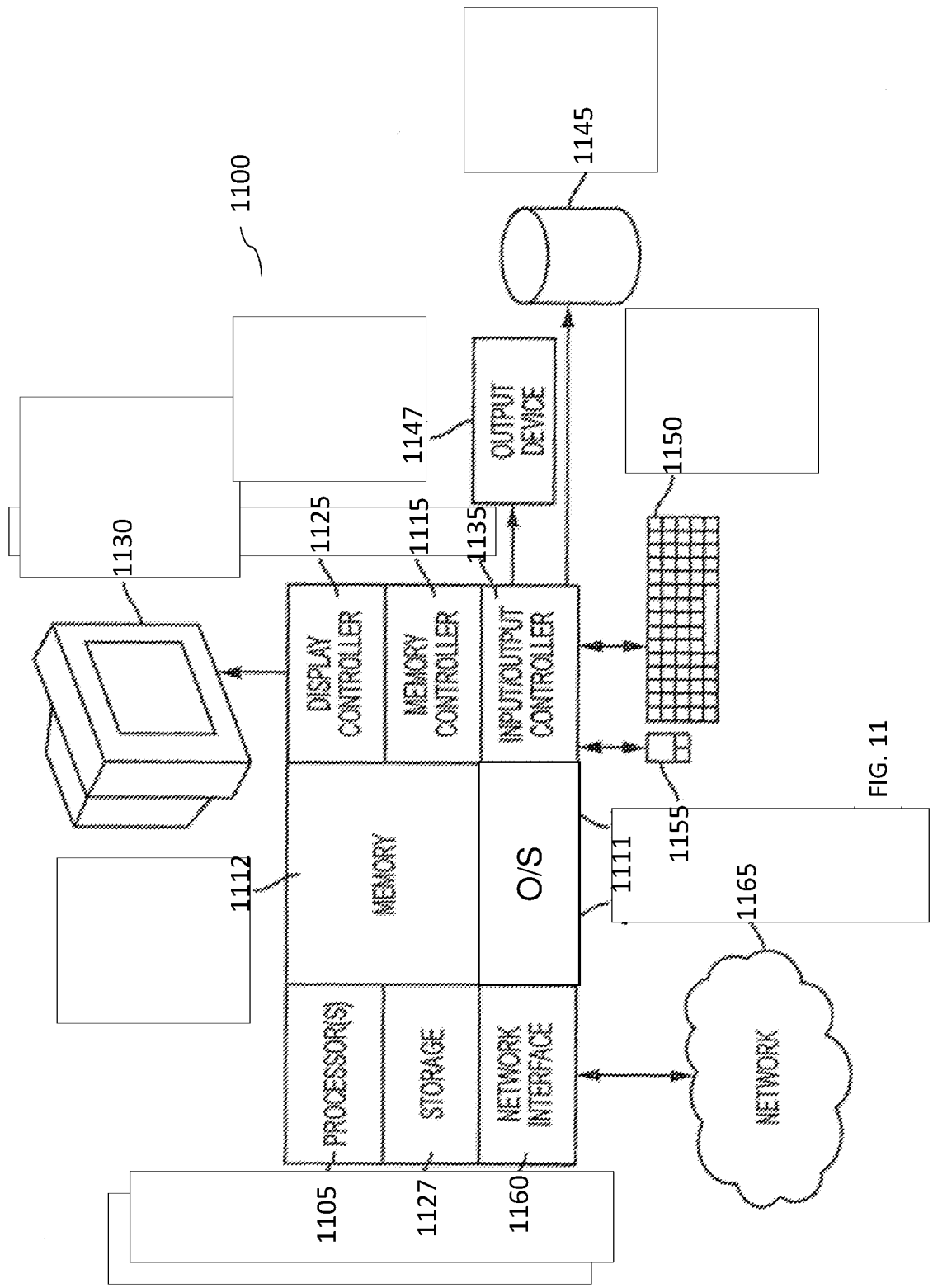
FIG. 11 depicts a block diagram of a computer system for implementing some or all aspects of memory mirror invocation upon detecting a CE in a memory in accordance with one or more embodiments of the present invention.

Turning now to FIG. 11, a block diagram of a computer system 1100 for implementing some or all aspects of memory mirror invocation upon detecting a correctable error (CE) in a memory is generally shown according to one or more embodiments of the present invention. The processing described herein may be implemented in hardware, software (e.g., firmware), or a combination thereof. In an exemplary embodiment, the methods described may be implemented, at least in part, in hardware and may be part of the microprocessor of a special or general-purpose computer system 1100, such as a mobile device, personal computer, workstation, minicomputer, or mainframe computer.

In an exemplary embodiment, as shown in FIG. 11, the computer system 1100 includes a processor 1105, memory 1112 coupled to a memory controller 1115, and one or more input devices 1145 and/or output devices 1147, such as peripherals, that are communicatively coupled via a local I/O controller 1135. These devices 1147 and 1145 may include, for example, a printer, a scanner, a microphone, and the like. A conventional keyboard 1150 and mouse 1155 may be coupled to the I/O controller 1135. The I/O controller 1135 may be, for example, one or more buses or other wired or wireless connections, as are known in the art. The I/O controller 1135 may have additional elements, which are omitted for simplicity, such as controllers, buffers (caches), drivers, repeaters, and receivers, to enable communications.

The I/O devices 1147, 1145 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 1105 is a hardware device for executing hardware instructions or software, particularly those stored in memory 1112. The processor 1105 may be a custom made or commercially available processor, a central processing unit (CPU), an auxiliary processor among several processors associated with the computer system 1100, a semiconductor based microprocessor (in the form of a microchip or chip set), a microprocessor, or other device for executing instructions. The processor 1105 can include a cache such as, but not limited to, an instruction cache to speed up executable instruction fetch, a data cache to speed up data fetch and store, and a translation look-aside buffer (TLB) used to speed up virtual-to-physical address translation for both executable instructions and data. The cache may be organized as a hierarchy of more cache levels (L1, L2, etc.).

The memory 1112 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 1112 may incorporate electronic, magnetic, optical, or other types of storage media. Note that the memory 1112 may have a distributed architecture, where various components are situated remote from one another but may be accessed by the processor 1105.

The instructions in memory 1112 may include one or more separate programs, each of which comprises an ordered listing of executable instructions for implementing logical functions. In the example of FIG. 11, the instructions in the memory 1112 include a suitable operating system (OS) 1111. The operating system 1111 essentially may control the execution of other computer programs and provides scheduling, input-output control, file and data management, memory management, and communication control and related services.

Additional data, including, for example, instructions for the processor 1105 or other retrievable information, may be stored in storage 1127, which may be a storage device such as a hard disk drive or solid state drive. The stored instructions in memory 1112 or in storage 1127 may include those enabling the processor to execute one or more aspects of the dispatch systems and methods of this disclosure.

The computer system 1100 may further include a display controller 1125 coupled to a display 1130. In an exemplary embodiment, the computer system 1100 may further include a network interface 1160 for coupling to a network 1165. The network 1165 may be an IP-based network for communication between the computer system 1100 and an external server, client and the like via a broadband connection. The network 1165 transmits and receives data between the computer system 1100 and external systems. In an exemplary embodiment, the network 1165 may be a managed IP network administered by a service provider. The network 1165 may be implemented in a wireless fashion, e.g., using wireless protocols and technologies, such as WiFi, WiMax, etc. The network 1165 may also be a packet-switched network such as a local area network, wide area network, metropolitan area network, the Internet, or other similar type of network environment. The network 1165 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods for providing memory mirror invocation upon detecting a CE in a memory as described herein can be embodied, in whole or in part, in computer program products or in computer systems 1100, such as that illustrated in FIG. 11.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
fetching data requested by a requestor from a primary memory in a memory system that includes the primary memory and a secondary memory mirroring the primary memory;
determining an error status of the data fetched from the primary memory, the error status selected from the group consisting of correctable error (CE), uncorrectable error (UE), and no error;
based at least in part on determining that the data fetched from the primary memory has the error status of no error, outputting the data fetched from the primary memory to the requestor;
based at least in part on determining that the data fetched from the primary memory has the error status of UE, fetching the data requested by the requestor from the secondary memory;
based at least in part on determining that the data fetched from the primary memory has the error status of CE, fetching the data requested by the requestor from the secondary memory;
based at least in part on fetching the data requested by the requestor from the secondary memory, determining the error status of the data fetched from the secondary memory;
based at least in part on determining that the data fetched from the secondary memory has the error status of no error, outputting the data fetched from the secondary memory to the requestor;

based at least in part on detecting that both the data fetched from the primary memory and the data fetched from the secondary memory have the error status of UE:
  setting a UE flag to indicate a UE; and
  outputting the UE flag to the requestor; and
based at least in part on detecting that both the data fetched from the primary memory and the data fetched from the secondary memory have the error status of CE:
  comparing contents of the data fetched from the primary memory and the data fetched from the secondary memory;
  outputting the data fetched from the primary memory to the requestor based at least in part on contents of the data fetched from the primary memory and contents of the data fetched from the secondary memory having the same value; and
  setting the UE flag to indicate a UE and outputting the UE flag to the requestor based at least in part on contents of the data fetched from the primary memory and contents of the data fetched from the secondary memory having a different value.

2. The computer-implemented method of claim 1, further comprising:
  based at least in part on determining that the data fetched from the primary memory has the error status of CE and that the data fetched from the secondary memory has the error status of UE, outputting the data fetched from the primary memory to the requestor; and
  based at least in part on determining that the data fetched from the primary memory has the error status of UE and that the data fetched from the secondary memory has the error status of CE, outputting the data fetched from the secondary memory to the requester.

3. The computer-implemented method of claim 1, further comprising:
  based at least in part on detecting that the data fetched from the secondary memory has the error status of CE, outputting an UE indicator to the requestor.

4. The computer-implemented method of claim 1, wherein the primary memory and the secondary memory each include a memory device.

5. The computer-implemented method of claim 1, wherein the primary memory and the secondary memory each include a memory module comprising one or more memory devices.

6. A system comprising:
  a memory having computer readable instructions; and
  one or more processors for executing the computer readable instructions, the computer readable instructions controlling the one or more processors to perform operations comprising:
    fetching data requested by a requestor from a primary memory in a memory system that includes the primary memory and a secondary memory mirroring the primary memory;
    determining an error status of the data fetched from the primary memory, the error status selected from the group consisting of correctable error (CE), uncorrectable error (UE), and no error;
    based at least in part on determining that the data fetched from the primary memory has the error status of no error, outputting the data fetched from the primary memory to the requestor;
    based at least in part on determining that the data fetched from the primary memory has the error status of UE, fetching the data requested by the requestor from the secondary memory;
    based at least in part on determining that the data fetched from the primary memory has the error status of CE, fetching the data requested by the requestor from the secondary memory;
    based at least in part on fetching the data requested by the requestor from the secondary memory, determining the error status of the data fetched from the secondary memory;
    based at least in part on determining that the data fetched from the secondary memory has the error status of no error, outputting the data fetched from the secondary memory to the requestor;
    based at least in part on detecting that both the data fetched from the primary memory and the data fetched from the secondary memory have the error status of UE:
      setting a UE flag to indicate a UE; and
      outputting the UE flag to the requestor; and
    based at least in part on detecting that both the data fetched from the primary memory and the data fetched from the secondary memory have the error status of CE:
      comparing contents of the data fetched from the primary memory and the data fetched from the secondary memory;
      outputting the data fetched from the primary memory to the requestor based at least in part on contents of the data fetched from the primary memory and contents of the data fetched from the secondary memory having the same value; and
      setting the UE flag to indicate a UE and outputting the UE flag to the requestor based at least in part on contents of the data fetched from the primary memory and contents of the data fetched from the secondary memory having a different value.

7. The system of claim 6, the operations further comprising:
  based at least in part on determining that the data fetched from the primary memory has the error status of CE and that the data fetched from the secondary memory has the error status of UE, outputting the data fetched from the primary memory to the requestor; and
  based at least in part on determining that the data fetched from the primary memory has the error status of UE and that the data fetched from the secondary memory has the error status of CE, outputting the data fetched from the secondary memory to the requester.

8. The system of claim 6, the operations further comprising:
  based at least in part on detecting that the data fetched from the secondary memory has the error status of CE, outputting an UE indicator to the requestor.

9. The system of claim 6, wherein the primary memory and the secondary memory each include a memory device.

10. The system of claim 6, wherein the primary memory and the secondary memory each include a memory module comprising one or more memory devices.

11. A computer program product comprising a computer readable storage medium having program instructions embodied therewith, the program instructions executable by a processor to cause the processor to perform operations comprising:

fetching data requested by a requestor from a primary memory in a memory system that includes the primary memory and a secondary memory mirroring the primary memory;

determining an error status of the data fetched from the primary memory, the error status selected from the group consisting of correctable error (CE), uncorrectable error (UE), and no error;

based at least in part on determining that the data fetched from the primary memory has the error status of no error, outputting the data fetched from the primary memory to the requestor;

based at least in part on determining that the data fetched from the primary memory has the error status of UE, fetching the data requested by the requestor from the secondary memory;

based at least in part on determining that the data fetched from the primary memory has the error status of CE, fetching the data requested by the requestor from the secondary memory;

based at least in part on fetching the data requested by the requestor from the secondary memory, determining the error status of the data fetched from the secondary memory;

based at least in part on determining that the data fetched from the secondary memory has the error status of no error, outputting the data fetched from the secondary memory to the requestor;

based at least in part on detecting that both the data fetched from the primary memory and the data fetched from the secondary memory have the error status of UE:

setting a UE flag to indicate a UE; and
outputting the UE flag to the requestor; and based at least in part on detecting that both the data fetched from the primary memory and the data fetched from the secondary memory have the error status of CE:

comparing contents of the data fetched from the primary memory and the data fetched from the secondary memory;

outputting the data fetched from the primary memory to the requestor based at least in part on contents of the data fetched from the primary memory and contents of the data fetched from the secondary memory having the same value; and setting the UE flag to indicate a UE and outputting the UE flag to the requestor based at least in part on contents of the data fetched from the primary memory and contents of the data fetched from the secondary memory having a different value.

12. The computer program product of claim 11, the operations further comprising:

based at least in part on determining that the data fetched from the primary memory has the error status of CE and that the data fetched from the secondary memory has the error status of UE, outputting the data fetched from the primary memory to the requestor; and based at least in part on determining that the data fetched from the primary memory has the error status of UE and that the data fetched from the secondary memory has the error status of CE, outputting the data fetched from the secondary memory to the requester.

* * * * *